Nov. 20, 1923. 1,474,793
A. A. SCOTT
APPARATUS FOR REMOVING BURNT BRICK FROM A KILN, STACK, PILE OR THE LIKE
Filed April 28, 1921 5 Sheets-Sheet 1

Inventor
Alexander A. Scott
By James R. Hodder
Attorney

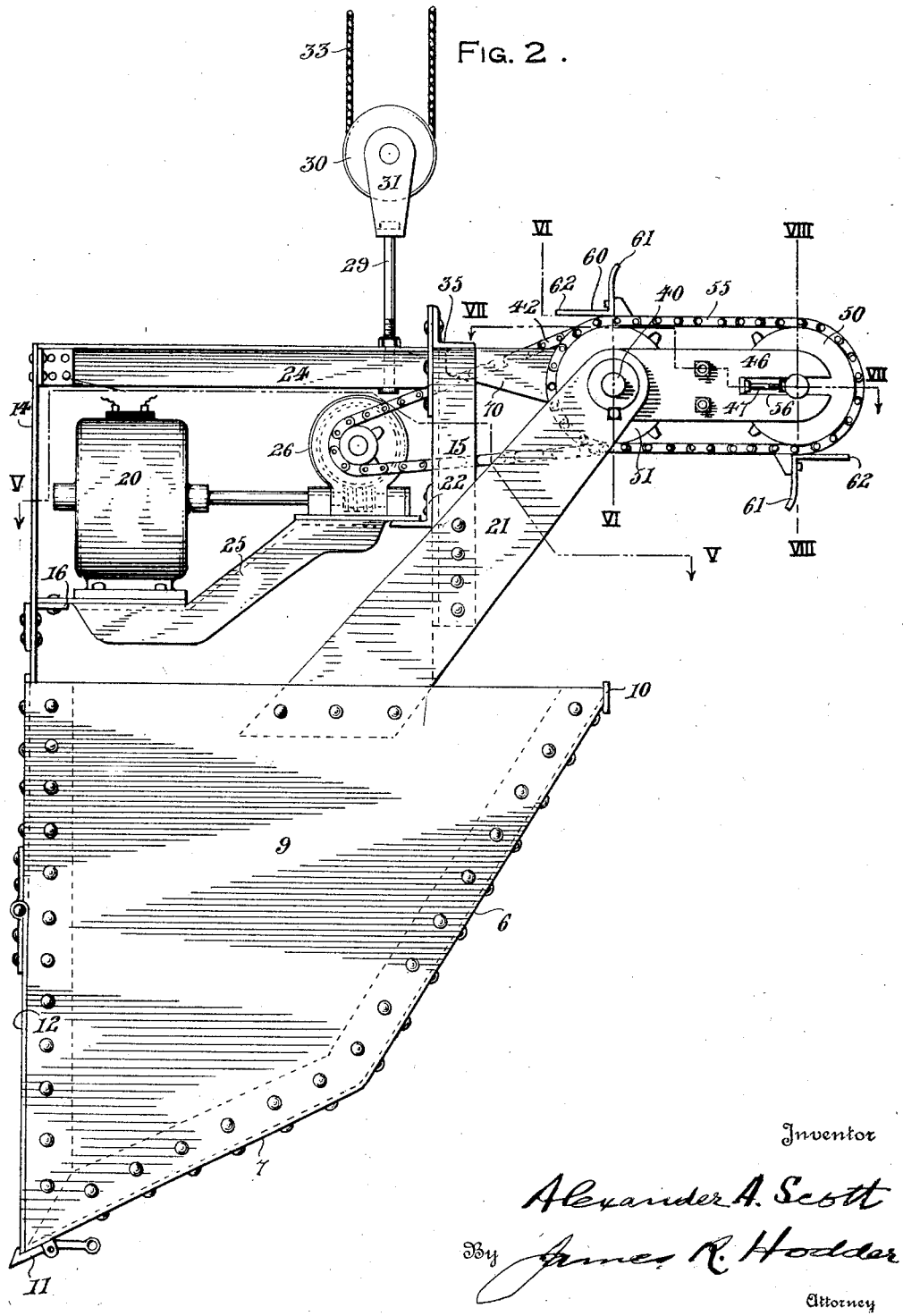

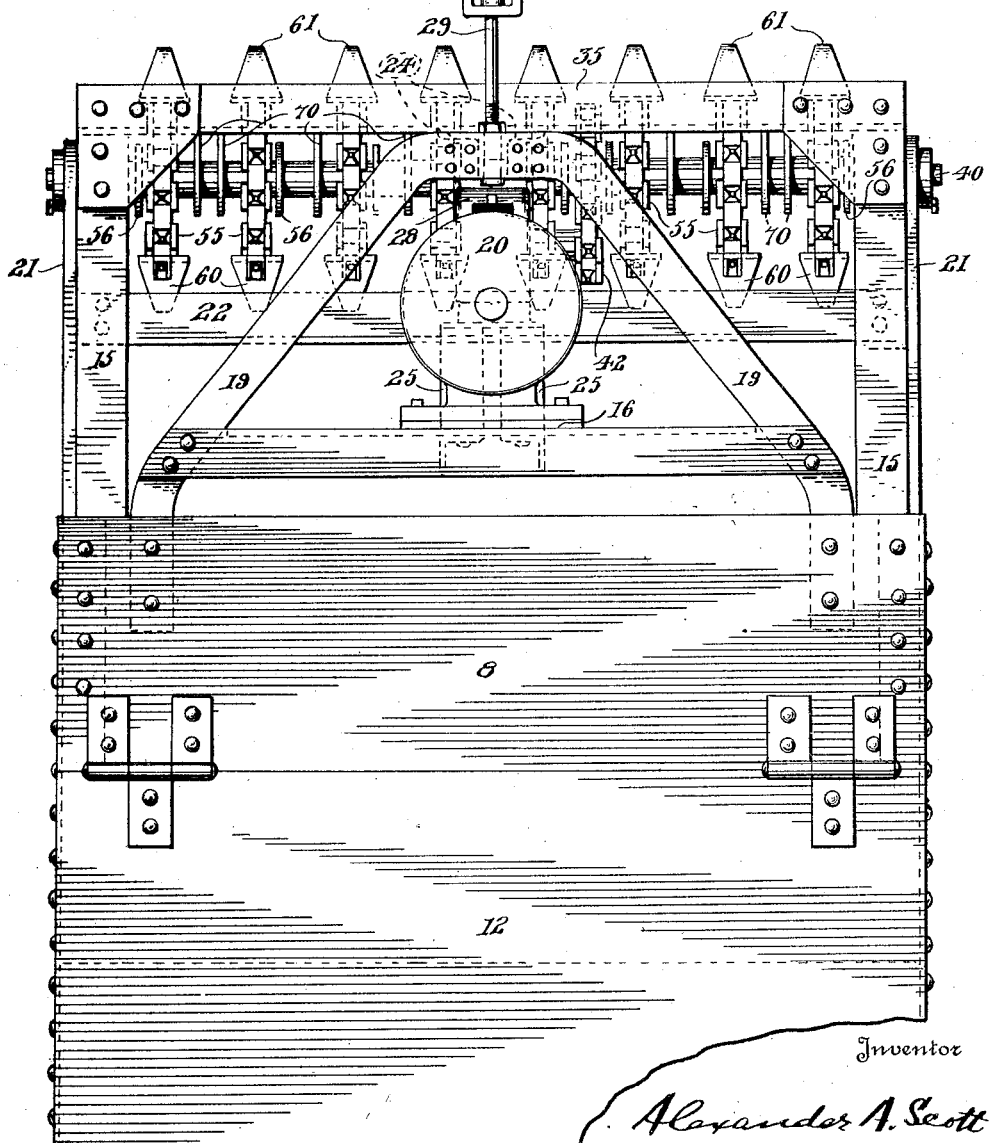

Nov. 20, 1923.  
A. A. SCOTT  
1,474,793  
APPARATUS FOR REMOVING BURNT BRICK FROM A KILN, STACK, PILE OR THE LIKE  
Filed April 28, 1921  5 Sheets-Sheet 4
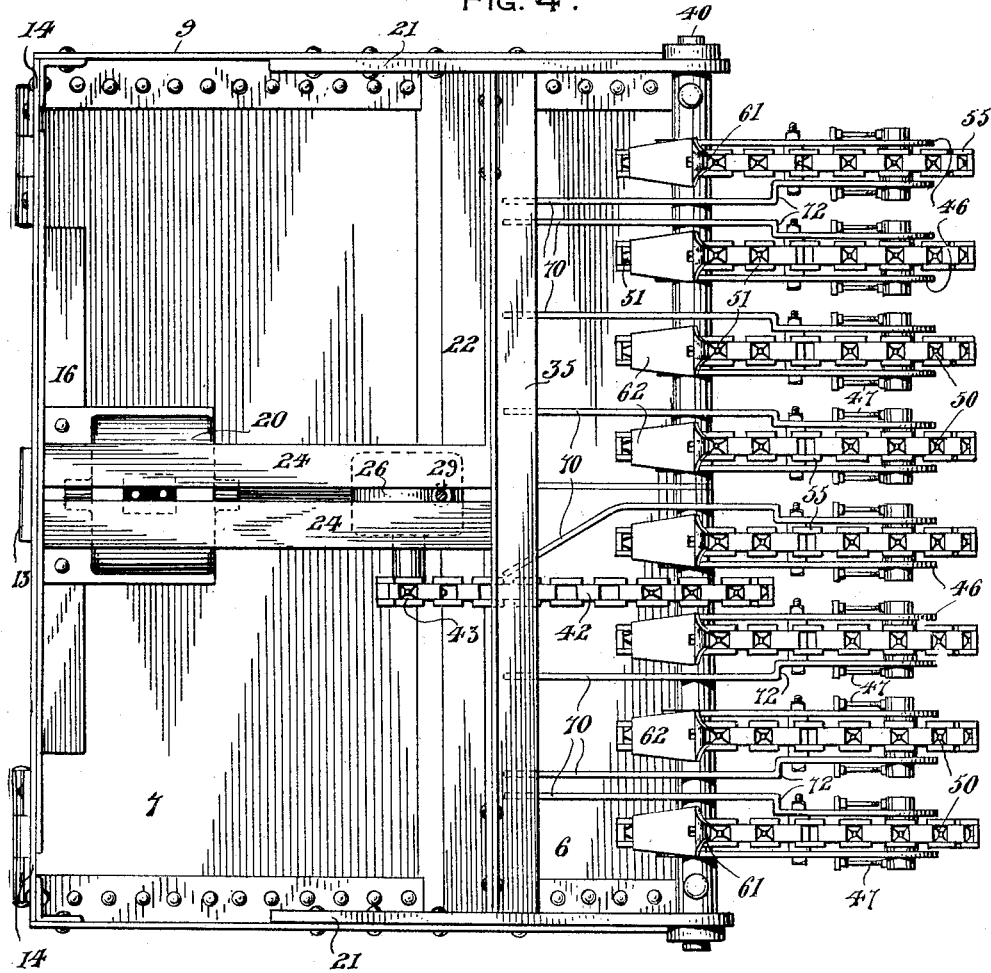
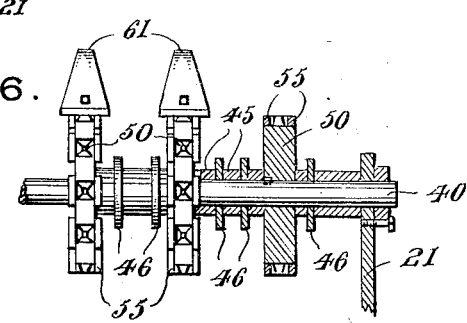
Inventor  
Alexander A Scott  
By James R Hodder  
Attorney Nov. 20, 1923. 1,474,793
A. A. SCOTT
APPARATUS FOR REMOVING BURNT BRICK FROM A KILN, STACK, PILE OR THE LIKE
Filed April 28, 1921 5 Sheets-Sheet 5
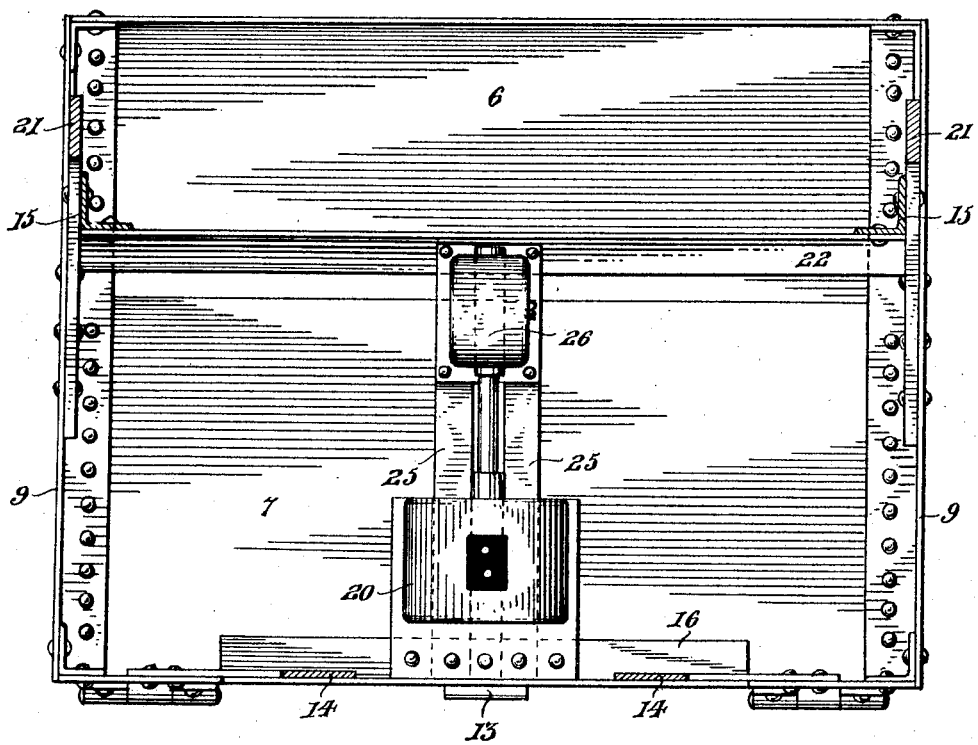
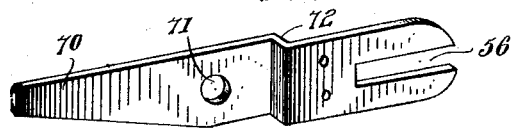
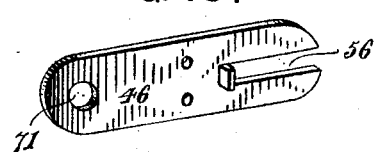
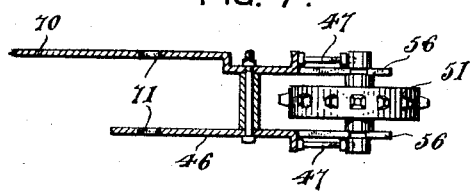
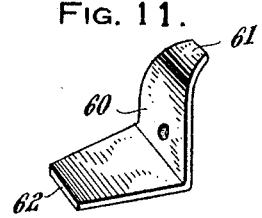
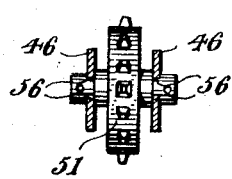
Inventor
Alexander A. Scott
By James R. Hodder
Attorney Patented Nov. 20, 1923.

1,474,793

UNITED STATES PATENT OFFICE.

ALEXANDER A. SCOTT, OF KNOXVILLE, TENNESSEE, ASSIGNOR TO BALTIMORE TRUST COMPANY, TRUSTEE.

APPARATUS FOR REMOVING BURNT BRICK FROM A KILN, STACK, PILE, OR THE LIKE.

Application filed April 28, 1921. Serial No. 465,209.

*To all whom it may concern:*

Be it known that I, ALEXANDER A. SCOTT, a citizen of the United States, and resident of Knoxville, in the county of Knox and State of Tennessee, have invented an Improvement in Apparatus for Removing Burnt Brick from a Kiln, Stack, Pile, or the like, of which the following description, in connection with the accompanying drawings, is a specification, like letters on the drawings representing like parts.

My present invention is an improved apparatus for removing burnt brick from a pile, stack or the like.

After a kiln of brick is burnt it is necessary to remove the brick therefrom, either for piling elsewhere or to transport the same in wagons, trucks, railroad cars, or boats, and heretofore it has been customary in practise to remove the brick by hand, using wheelbarrows, and a large number of operatives. My present invention contemplates the provision of automatic machinery so constructed and arranged as to engage, separate and remove or pull off from the face of the kiln, one or more rows of bricks and a plurality of brick in each row. It will be appreciated that a kiln of brick leaves the successive courses of brick piled with spacing or recesses therebetween, and taking advantage of this feature I provide a conveyor, having a plurality of endless chains, mounted upon pivotally movable arms, and brick engaging devices on each chain, constructed for and arranged to separate and pull the brick or rows of brick off the face of the kiln, starting at the top. This conveyor may be raised and lowered as desired and moved toward the successive faces of the kiln on which the removing operation is to be performed, the entire apparatus being preferably suspended from overhead crane or other suitable carrier permitting this operation.

An important feature of my present brick handling devices, consists in the provision of means which will automatically follow the undulations in the courses of the burnt brick.

As is well known, brick settles unevenly throughout the kiln, and consequently the course of the brick, which may have been in substantially true horizontal alinement when the kiln was set, are in disalined contour after burning. My apparatus enables each successive chain and arm conveyor to be independently movable vertically in order to follow this uneven line of the courses of brick after burning.

In combination with these removing chains, I provide a receiving hopper, which can be of any suitable size and of a capacity sufficient to receive and contain any predetermined number of brick, as for example, a truck load. When the burnt brick are removed and simultaneously the hopper filled, it is feasible to swing the entire hopper and removing apparatus over a truck, chute, or the like and release the hopper load of brick. In this matter great speed in unloading brick from a kiln and transferring it to and loading it onto a truck for immediate transportation is permitted in a substantially automatic manner and without manual handling of the brick. Any suitable means of operating the brick engaging members can be provided, but I prefer to utilize a small motor, carried directly on the hopper, and capable of ready and direct appliance of power to each of the chain carrying arms. Means are also provided to insure the proper action of the brick engaging devices, means affording a proper thrust of the same during the brick removing operation, and means for actuating all the chains and conveying devices in synchronism while permitting the raising and lowering of each arm independently to follow the inequalities in the brick kiln as it has "settled" as above explained.

Further features of the invention, novel combinations of parts and details will be hereinafter more fully pointed out and claimed.

Referring to the drawings, illustrating a preferred embodiment of my invention,

Fig. 2 is an enlarged side view of the apparatus;

Fig. 3 is a front view of the same, enlarged;

Fig. 4 is a plan view;

Fig. 5 is a rear end view;

Fig. 6 is a detailed fragmentary view;

Fig. 7 is a cross-sectional view on the line 7—7 of Fig. 2;

Fig. 8 is a view partly in cross-section on the line 8—8 of Fig. 2;

Fig. 9 is a perspective view of one of the pivoted members carrying the outer wheel and chain;

Fig. 10 is a side pivoted member; and

Fig. 11 is an enlarged view of the brick engaging members on the revolving chains.

Figure 1:
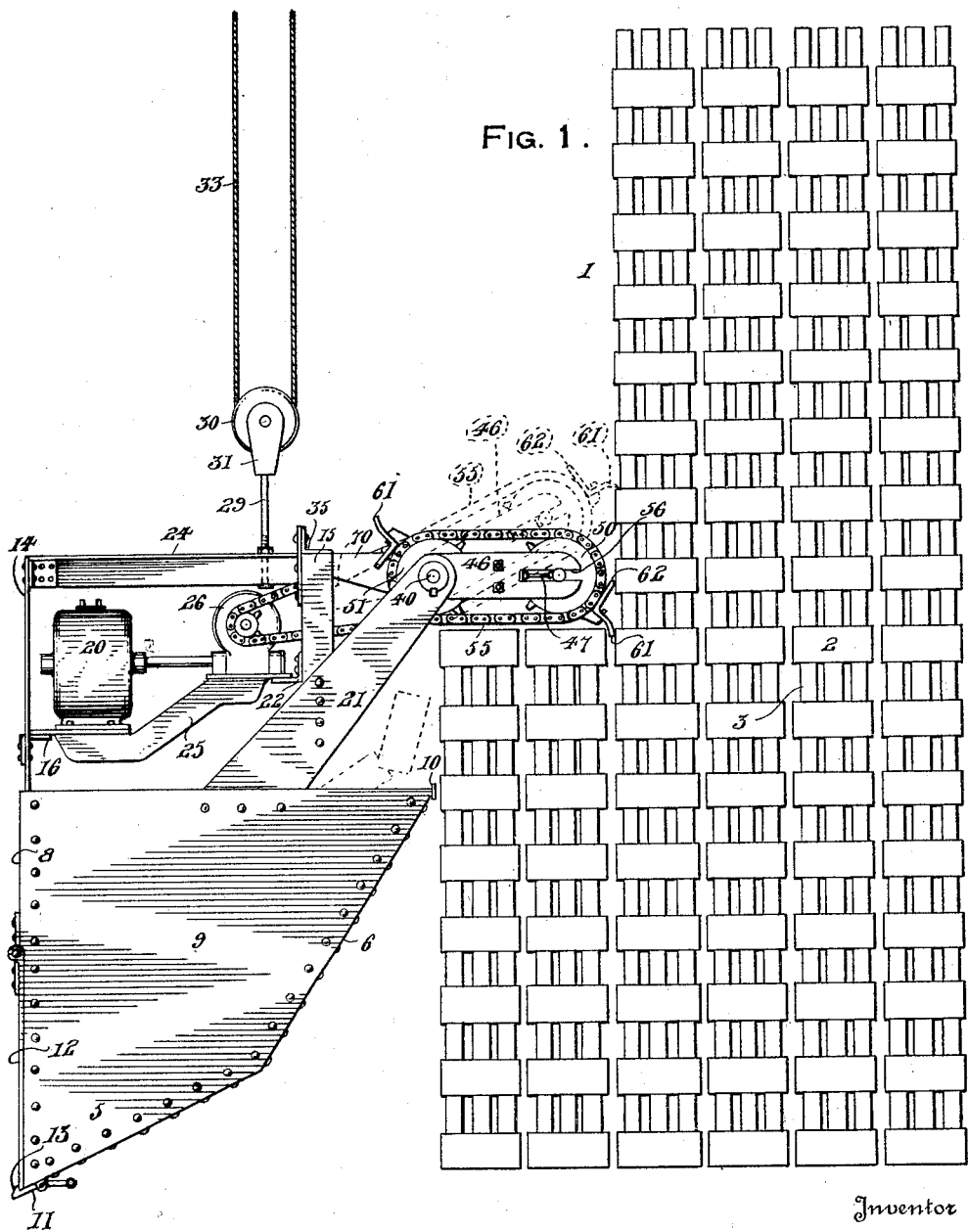
Fig. 1 is a side view of the unloading apparatus in operative position on the face of a kiln.

My invention contemplates the utilization of a combined unloading member or members and a receiving hopper or receptacle to be moved in unison and preferably by the same supporting member, transversely as well as vertically over the face of a kiln of burnt brick, or a stack or pile of brick to be removed, and for this purpose may be of any suitable length, width, size or other suitable dimensions. Preferably as herein shown I provide a receptacle of a size suitable to receive from the unloading devices a mass of brick sufficient for a complete truck load. Therefore the apparatus can be applied to the face of a brick stack or kiln, operated to fill the receptacle completely, and then unloaded instantly by the opening of a chute, door or release of a portion of the bottom of the receptacle, to deliver the entire load into the waiting truck, car or wagon. Furthermore the entire apparatus can be moved or swung when loaded, into position over the truck or car for instant unloading and then be repositioned for separating and removing the additional mass of brick from the kiln. In the meanwhile the loaded truck or car is moved and another one positioned for receiving the next load of the apparatus.

My invention, therefore, is a combined brick separating and removing, and truck loading device of any suitable size, power and capacity.

Referring to the drawings, Fig. 1 illustrates in diagrammatic form a mass of brick piled in usual hacked relation as in a brick kiln, from which the brick are to be removed after burning. The alternate courses of brick are usually piled or hacked at right angles to each other, as illustrated in the rows 2 and 3, the entire brick stack being designated generally by the reference character 1.

My apparatus comprises a hopper indicated at 5 having the front walls 6 and 7 at an angle or bevel and extending to the rear wall 8 which is preferably vertical, the sides or ends 9 completing the receptacle or hopper and with a bearing or wearing strip 10 along the front and uppermost edge for contact with the face of the kiln 1. The hopper is also provided with a swinging or sliding door 12, adapted to be held by any suitable latch, such for example as 13, which can be tripped in any usual or desired manner. This hopper is made of sheet iron, suitably reinforced or bolted at the corners and edges and is open at the top, but with an extending framework therefrom to carry the motor and brick engaging members. Such a framework can be readily secured to the rear and sides of the hopper and may comprise angle irons 14, 14, extending above the hopper at each rear edge and an inner framework 15, 15, to which is secured a cross brace 16 adapted to receive and carry a motor 20. Forwardly extending side arms or braces 21, 21, are bolted to the ends 9 and a cross brace 22 extends upwardly therefrom to be further strengthened by frame members 24 uniting the cross brace 22 with the rear brackets 14. From the cross brace 22 to the cross bracket 16 is a support 25, to carry the reducing gearing at 26 from the motor 20. This frame affords a rigid, light and firm construction from which the hopper is carried and which framework in turn carries the operating and moving parts of the mechanism. Preferably the entire apparatus is supported by a bolt 29, secured to an overhead pulley 30, pivoted between a yoke having arms 31 attached to said bolt 29 or by any other suitable means, a hoisting and lowering cable 32 to an overhead crane or other support permitting the raising and lowering, as well as the forward and back movement and universal adjustment for application of the apparatus to the brick kiln, positioning over the truck, etc. This bolt 29 is positioned to permit the apparatus to swivel or swing for self-adjustment against the face of the brick while still normally tending to maintain the entire apparatus in a predetermined plane.

On the forward crossbar 22 is a plate 35, preferably as an angle iron attached to the topmost part of the framework. This constitutes a rest, stop or guard to prevent the yielding part of the brick engaging and removing devices from falling downwardly, as will be explained. Pivoted to the forwardly extending bracket arms 21 is a shaft 40 extending widthwise of the entire apparatus, and constituting a driving means for the sprocket chains and brick engaging devices. This shaft 40 is provided with a sprocket wheel 41 which will be run by a chain 42, the same geared to a pulley 43, operated through the reduction gearing 26 from the motor 20. Preferably this sprocket wheel and the driving means are arranged substantially centrally of the shaft 40 as shown in Fig. 4. Mounted on the shaft 40 and keyed thereto are a plurality of pulleys 50, 50, spaced apart by collars or rings 45, which also space the arms 46, 46, through which the shaft 40 extends and which arms run forwardly for the length desired to constitute supports and bearings for the forward chain wheels 51. These arms 46 are thus pivoted upon the shaft 40 and may raise and lower the outer wheels 51, each independently of the adjacent set of wheels during the operation of the device. A chain 55 unites each wheel 50 with the outer wheel 51, suitable tension and adjustment being provided by a slot 56 in the outer part of the arm 46 in which an adjusting screw 47 bears against the axle or shafts of the outer pulley 51. These arms 46 are thus rocker arms as well as supports for the outer pulley, a pair of the same being adjacent each inner wheel 50 to straddle it, the collars 45 spacing the same from the pulley as well as from each other (see Fig. 6).

Attached to each chain 55 is a plurality of brick engaging and separating members 60, having a forwardly pointing or extending flange 61 and a rearward portion 62. The operation of these devices will be readily understood on reference to Figs. 1 and 2. The forward arm 61 is slightly pointed and therefore as the chain 55 goes around the outer pulley 51, this point 61 of the pushing device 60 will enter between the interstices in the adjacent brick, and as the travel of the chain continues, the flange portion 62 will bear against the chain and thus keep the point 61 vertical, thereby removing and pulling off the brick thus engaged. The point 61 quickly finds the interstices and each chain with the pushing member 60 being free to be raised and lowered as desired or as it finds the work, each chain automatically accommodating itself to the unevennesses in the horizontal plane of the work engaged. All the chains being operated in unison practically pull off the brick together and the apparatus being gradually lowered till a plurality of courses have been removed within the range of the pusher 60, the hopper is quickly filled.

In order to maintain the outer pulleys in a substantially horizontal alinement with the inner pulleys, alternate bracket members for each set are provided with relatively long rearwardly extending arms 70, projecting under the plate 35. Thus these supporting arms and the outer pulleys 51 can be raised freely, but will not be depressed below the horizontal plane of the inner pulley 50. I prefer to make the bracket arms having the rearwardly extending portions 70 slightly offset as shown in Fig. 9, to more surely clear the pushers 60 as they complete their circle around the pulleys 50 and 51, pivoting these arms on the shaft 50 at 71, beyond the offset or right angle portion 72 as clearly shown in Fig. 9.

The operation of each one of the several chains and pushers is identical, but each follows its own individual brick engaging, separating and removing action, as well as being automatically self-adjusting for the horizontal plane from which the brick are engaged and removed.

I have illustrated in Fig. 1, in dotted lines, the height to which these independent arms may be raised, which is considerably more than any possible disalinement of the brick. It will also be appreciated that I am not limited to such chains and brick removing devices as are illustrated in the drawings wherein only two brick deep or approximately seven brick wide widthwise are removed, since these may be considerably longer in actual practise.

The entire apparatus is easily applied to the brick stack or kiln, it may be continuously operated by the motor 20 or intermittently operated, stopping the same when swinging the hopper away from the face of the kiln to discharge the brick. Also the apparatus may be applied to the face of the kiln and moved continuously thereacross, the accumulated brick within the receptacle 5 being discharged from time to time by opening the gate 12 at any desired point, as the apparatus moves over trucks, cars, or other transporting devices. The lifting cable being over the approximate center of gravity of the device, it is maintained normally level, yet free to adjust itself at all times against the particular work, kiln, etc.

My present invention is further described and defined in the form of claims as follows:

1. Apparatus of the kind described, comprising a brick carrying receptacle, means cooperating with said receptacle to extend therefrom, and engage the rows of brick remote from said receptacle, said engaging means constituting brick removing means to transfer brick from a stack to the receptacle, and including an endless conveyor, having brick moving devices thereon, said endless conveyor being arranged for variable vertical positions with regard to the brick.

2. Apparatus of the kind described, comprising a brick carrying receptacle, means cooperating with said receptacle to extend therefrom, and engage the rows of brick remote from said receptacle, said engaging means constituting the brick removing means to transfer brick from the stack to the receptacle, and including a plurality of endless conveyors, each having brick moving devices thereon, each of said conveyors being independently vertically movable with regard to the brick.

3. Apparatus of the kind described adapted to remove brick from a stack or pile, consisting in a brick hopper, means on said hopper to contact with the face of the brick stack, means to raise and lower said hopper, a plurality of brick engaging devices extending from said hopper beyond the portion adapted to contact with the face of the stack, said brick engaging devices comprising a plurality of endless conveyors, arranged and mounted to move over the topmost courses of the brick stack, with provision for varying adjustment in height of each conveyor, and means to rotate said endless conveyors.

4. Apparatus of the kind described adapted to remove brick from a stack or pile, consisting in a brick hopper, means on said hopper to contact with the face of the brick stack, means to raise and lower said hopper, a plurality of brick engaging devices extending from said hopper beyond the portion adapted to contact with the face of the stack, said brick engaging devices comprising a plurality of endless conveyors, arranged and mounted to move over the topmost courses of the brick stack, with provision for varying adjustment in height of each conveyor, and means to rotate said endless conveyors, in unison, while permitting freedom of vertical movement of each conveyor.

5. Apparatus of the kind described, comprising a brick carrying hopper, a plurality of endless conveyors mounted on said hopper, and adapted to move brick from a stack into the hopper, each conveyor having a plurality of brick separating and moving members, said members having a rearwardly extending flange adapted to bear against the conveyor to afford a thrust bearing to move the brick conveyed.

In testimony whereof, I have signed my name to this specification.

ALEXANDER A. SCOTT.